May 4, 1926.
S. I. FEKETE
1,583,286
PISTON FOR INTERNAL COMBUSTION ENGINES
Filed Dec. 1, 1921
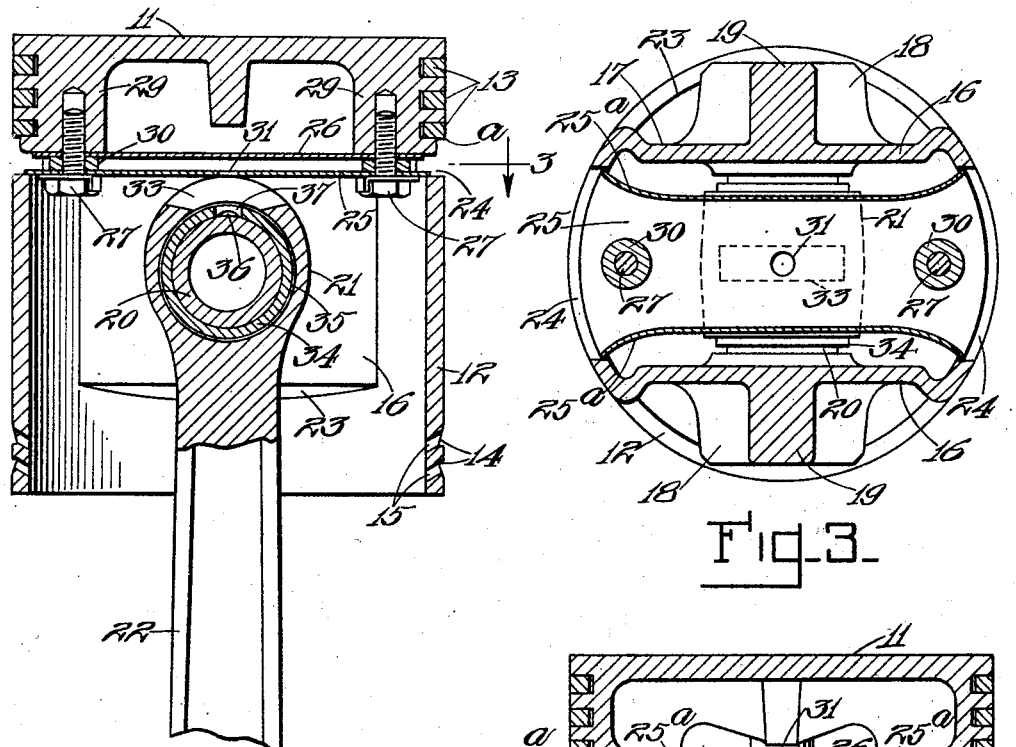
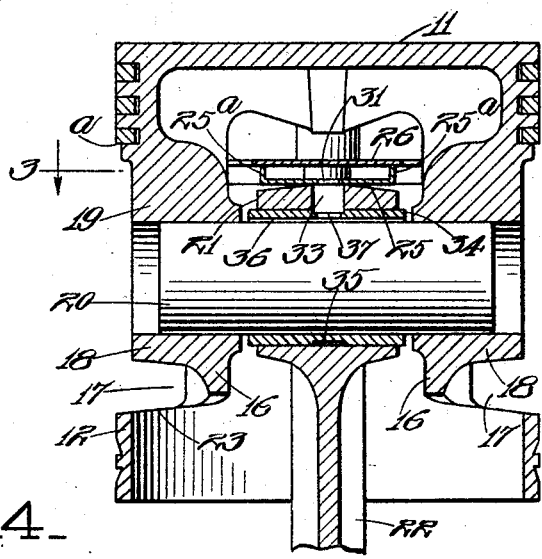
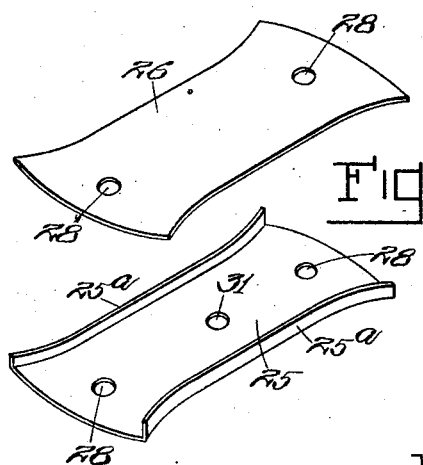
INVENTOR:
Stephen Ivan Fekete
By Macleod, Calver, Copeland & Dike
ATTYS.

Patented May 4, 1926.

1,583,286

UNITED STATES PATENT OFFICE.

STEPHEN IVAN FEKETE, OF DETROIT, MICHIGAN, ASSIGNOR TO ESSEX MOTORS, OF DETROIT, MICHIGAN, A CORPORATION OF MICHIGAN.

PISTON FOR INTERNAL-COMBUSTION ENGINES.

Application filed December 1, 1921. Serial No. 519,261.

*To all whom it may concern:*

Be it known that I, STEPHEN IVAN FE-KETE, a citizen of the United States, residing at Detroit, county of Wayne, State of Michigan, have invented a certain new and useful Improvement in Pistons for Internal-Combustion Engines, of which the following is a specification, reference being had therein to the accompanying drawings.

This invention relates to pistons for use in internal combustion engines and has for an object to provide improved and effective means for automatically conducting oil from the cylinder walls to the wrist pin for the purpose of properly lubricating the latter.

The foregoing and other objects of the invention, together with means whereby the same may be carried into effect, will best be understood from the following description of one form or embodiment thereof illustrated in the accompanying drawings, the novel features of said invention being particularly pointed out in the claims hereunto appended.

In said drawings, Figs. 1 and 2 are substantially central longitudinal sections, taken on planes perpendicular to each other, of a piston constructed in accordance with the invention.

Fig. 3 is a transverse section taken substantially on the line 3 of Figures 1 and 2.

Fig. 4 is a detail perspective view of the tray and cover constituting the oil conduit.

Referring now to the drawings, the top of the piston is indicated at 11 and the skirt at 12. The piston is provided, adjacent the top 11, with a suitable number of annular grooves to receive the usual piston rings 13, three of said rings being shown in the drawings. The bottom of the skirt 12 is formed with two oil scraper grooves 14 provided with oil ports 15 through which oil collected in said grooves is returned to the interior of the piston and thence to the crank case or sump. On two opposite sides of the piston, the walls thereof are depressed inwardly, as shown at 16 (see particularly Fig. 3), to form recesses 17, said depressed portions 16 of the walls being formed with integral outwardly extending wrist pin bearings 18 stiffened by vertical webs 19. Supported in the bearings 18, is a wrist pin 20 which is encircled between said bearings by the strap portion 21 of the usual connecting rod 22. At the bottoms of the recesses 17 are formed slots or openings 23 through which oil finding its way into said recesses may pass to the interior of the piston and thence return to the sump.

Above the wrist pin bearings 18, and adjacent the upper ends of the recesses 17, the piston is formed or provided with an annular oil scraping edge *a*. In the construction herein shown, said edge is provided by the lowermost piston ring 13, although, if preferred, it may comprise an integral portion of the piston itself, as in my prior application for Letters Patent filed May 20, 1921, Serial No. 471,101. Immediately below the oil scraping edge *a*, the piston walls between the upper ends of the recesses 17 are formed with oppositely disposed arcuate slots 24 lying substantially in a plane above the wrist pin 20. Supported at its ends in the slots 24, and extending transverse to the wrist pin 20, is an oil conduit comprising a tray 25 and a cover 26. The tray 25 is formed with flaring open ends adjacent the slots 24 and with longitudinal side flanges 25ª on the free edges of which the cover 26 is seated when the parts are assembled. Said parts are held in assembled position in the piston by means of cap screws 27 which extend through suitable openings 28 in the tray and cover and engage tapped openings in lugs 29 depending from the top 11 of the piston, suitable spacing washers 30 being interposed between the tray and cover and surrounding said screws. At its central portion, the tray 25 is formed with an oil-delivering or feeding opening 31 which is disposed immediately over the wrist pin 20 and the connecting rod strap portion 21. Said strap portion is formed with a slot 33 adapted to receive oil from said opening 31. Interposed between the wrist pin 20 and strap portion 21 is a bushing 34 having an annular exterior groove 35 communicating with the slot 33, a longitudinal interior groove 36, and a port or opening 37 connecting said grooves.

As will now be seen, oil removed from the cylinder wall by the oil scraping edge *a*, will, in part, find its way to the recesses 17 and thence through the openings 23 to the interior of the piston and eventually to the sump. The remainder of said oil, passing through the slots 24 to the tray 25, will be conducted thereby to the oil-feeding opening 31 which will deliver the same to the slot 33 in the connecting rod strap portion, whence said oil will pass through the groove 35, port 37 and groove 36 in the bushing 34 to the wrist pin 20.

What I claim is:

1. A piston for internal combustion engines having an oil scraping edge, wrist pin bearings, a wrist pin carried by said bearings, and means independent of the piston for conducting oil from said scraping edge to said wrist pin between said bearings.

2. A piston for internal combustion engines having an oil scraping edge, oppositely disposed slots adjacent said edge, wrist pin bearings, a wrist pin carried by said bearings, and an oil conduit comprising a tray and a cover therefor supported by said slots, said conduit being arranged to receive oil from said scraping edge and having an opening for delivering said oil to the said wrist pin.

3. A piston for internal combustion engines having an oil scraping edge, wrist pin bearings, and a wrist pin carried by said bearings, said piston having also oppositely disposed slots immediately below said oil scraping edge and located substantially in a plane above said wrist pin, a tray supported at its ends by said slots and extending transverse to said wrist pin, said tray having flaring open ends adjacent said slots, an oil feed opening above said wrist pin, and longitudinal side flanges, a cover for said tray seated on said flanges, and means comprising screws and spacing washers for holding said tray and cover in assembled position.

4. A piston for internal combustion engines having an oil scraping edge, wrist pin bearings, a wrist pin carried by said bearings, a connecting rod having a strap portion encircling said wrist pin and formed with an oil receiving slot, and an oil conduit independent of the piston for conducting oil from said scraping edge to said slot.

5. A piston for internal combustion engines having an oil scraping edge, wrist pin bearings, a wrist pin carried by said bearings, a connecting rod having a strap portion encircling said wrist pin and formed with an oil receiving slot, said piston having also oppositely disposed slots adjacent said oil scraping edge, and an oil conduit comprising a tray and a cover therefor supported by said piston slots, said conduit being arranged to receive oil from said scraping edge and having an opening for delivering said oil to the slot in the strap portion of said connecting rod.

6. A piston for internal combustion engines having an oil scraping edge, wrist pin bearings, a wrist pin carried by said bearings, a connecting rod having a strap portion encircling said wrist pin and formed with an oil receiving slot, means for conducting oil from said scraping edge to said slot, and a bushing interposed between said wrist pin and strap portion, said bushing having an annular exterior groove communicating with the slot in said strap portion, a longitudinal interior groove, and an opening connecting said grooves.

7. A piston for internal combustion engines having wrist pin bearings and an oil scraping edge, openings below said edge and above the wrist pin bearings, a wrist pin, a connecting rod engaging said wrist pin and having an oil hole on the top thereof, and an oil conduit extending diametrically of the piston with its ends at the said openings and having an opening adjacent the oil hole in the said connecting rod.

In testimony whereof I affix my signature.

STEPHEN IVAN FEKETE.